US012636214B2

(12) United States Patent
Choi et al.

(10) Patent No.: US 12,636,214 B2
(45) Date of Patent: May 26, 2026

(54) SUPPORTER HAVING BISTABLE SPRING, AND EXERCISE ASSISTANCE APPARATUS INCLUDING SAME

(71) Applicant: SAMSUNG ELECTRONICS CO., LTD., Suwon-si (KR)

(72) Inventors: Byungjune Choi, Suwon-si (KR); Younbaek Lee, Suwon-si (KR); Se-gon Roh, Suwon-si (KR); Minhyung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 815 days.

(21) Appl. No.: 18/092,536

(22) Filed: Jan. 3, 2023

(65) Prior Publication Data

US 2023/0149243 A1 May 18, 2023

Related U.S. Application Data

(63) Continuation of application No. PCT/KR2021/001341, filed on Feb. 2, 2021.

(30) Foreign Application Priority Data

Jul. 3, 2020 (KR) ........................ 10-2020-0082241
Oct. 21, 2020 (KR) ........................ 10-2020-0136636

(51) Int. Cl.
*A61H 3/00* (2006.01)
*A61H 1/02* (2006.01)

(52) U.S. Cl.
CPC ......... *A61H 1/024* (2013.01); *A61H 2201/14* (2013.01); *A61H 2201/164* (2013.01); *A61H 2201/165* (2013.01); *A61H 2201/1654* (2013.01)

(58) Field of Classification Search
CPC ................ A61H 3/00; A61H 2201/165; A61H 2201/0192; A61H 2003/007;
(Continued)

(56) References Cited

U.S. PATENT DOCUMENTS 5,628,069 A * 5/1997 Ebert .............. A41D 19/01582 2/163
9,022,958 B2 5/2015 Shimizu et al.
(Continued)

FOREIGN PATENT DOCUMENTS

CN 105357997 A 2/2016
CN 108942882 A 12/2018
(Continued)

OTHER PUBLICATIONS

Chinese Notice of Allowance dated Jul. 18, 2025 for CN Application No. 202180047503.2.
(Continued)

*Primary Examiner* — Timothy A Stanis
*Assistant Examiner* — Christopher E Miller
(74) *Attorney, Agent, or Firm* — Nixon & Vanderhye P.C.

(57) ABSTRACT

A supporter for a wearable exercise apparatus may include a main body; a pair of main frames connected to the main body; a pair of straps connected to the pair of main frames, respectively; and a bistable spring which is provided inside each of the pair of the straps and maintained in one of two stable states by a restoring force. The two stable states include a first stable state in which the bistable spring has a shape extending straight along the longitudinal direction and a second stable state in which the bistable spring has a shape that is bent once. The shape of the strap may be determined according to the shape of the bistable spring.

16 Claims, 15 Drawing Sheets

(58) Field of Classification Search
CPC ............ A41D 2200/10; A41D 2300/30; A41D 20/00; A41D 13/0568; A41D 13/0506; A41D 13/0525; A41D 13/05; A41D 13/015; A41D 13/0158; A41D 13/088; A41F 9/002; A41F 9/005; A41F 9/00; A45F 5/00; A45F 5/028
See application file for complete search history.

(56) References Cited

U.S. PATENT DOCUMENTS

| | | | | |
|---|---|---|---|---|
| 10,265,196 | B2 | 4/2019 | Ha et al. | |
| 10,455,900 | B2 | 10/2019 | Feinstein | |
| 2006/0052731 | A1 | 3/2006 | Shimada et al. | |
| 2010/0298746 | A1 | 11/2010 | Shimizu et al. | |
| 2012/0087216 | A1 | 4/2012 | Keung et al. | |
| 2012/0316477 | A1 | 12/2012 | Hamaya et al. | |
| 2013/0256345 | A1* | 10/2013 | Larkin | A45C 11/00 224/201 |
| 2015/0182009 | A1 | 7/2015 | Whang et al. | |
| 2017/0049628 | A1* | 2/2017 | Stevens | A61F 13/00085 |
| 2018/0049493 | A1* | 2/2018 | Graves | A45F 5/021 |
| 2020/0292128 | A1* | 9/2020 | Ahi | A45F 5/00 |
| 2020/0323332 | A1* | 10/2020 | Pierson | A45F 5/10 |

FOREIGN PATENT DOCUMENTS

| | | |
|---|---|---|
| EP | 3 132 783 | 2/2017 |
| JP | 2002-523182 | 7/2002 |
| JP | 2006-87533 | 4/2006 |
| JP | 2018-143720 | 9/2018 |
| JP | 2019107288 A | 7/2019 |
| KR | 10-1146112 | 5/2012 |
| KR | 10-2017-0024680 | 3/2017 |
| KR | 10-2019-0107314 | 9/2019 |
| WO | WO2018082512 A1 | 5/2018 |
| WO | WO 2019/152106 A1 | 8/2019 |

OTHER PUBLICATIONS

International Search Report and Written Opinion of the ISA for PCT/KR2021/001341 dated May 12, 2021, 9 pages.
Extended European Search Report dated Sep. 25, 2023 for EP Application No. 21831914.3.
Japanese Office Action dated Jul. 23, 2024 for JP Application No. 2022-574107.
Chinese Office Action dated Jan. 16, 2025 for CN Application No. 202180047503.2.

* cited by examiner

SUPPORTER HAVING BISTABLE SPRING, AND EXERCISE ASSISTANCE APPARATUS INCLUDING SAME

CROSS-REFERENCE TO RELATED APPLICATIONS

This application is a continuation application of International Application No. PCT/KR2021/001341 designating the United States, filed on Feb. 2, 2021, in the Korean Intellectual Property Receiving Office and claiming priority to Korean Patent Application No. 10-2020-0082241, filed on Jul. 3, 2020, and Korean Patent Application No. 10-2020-0136636, filed on Oct. 21, 2020, in the Korean Intellectual Property Office, the disclosures of which are all hereby incorporated by reference herein in their entireties.

BACKGROUND

1. Field

Certain example embodiments relate to a supported including a bistable spring and/or a wearable exercise assistance apparatus including same.

2. Description of Related Art

In general, an exercise assistance apparatus may be, for example and without limitation, a mechanism and/or a device that helps a patient, who cannot walk or has trouble walking on their own due to various diseases, accidents, and/or the like, to perform exercises for rehabilitation treatment. With aging societies recently accelerating, more people experience inconvenience in exercise or have difficulty in doing normal exercise due to malfunctioning joint issues, and accordingly, there is increasing interest in an exercise assistance apparatus. An exercise assistance apparatus may be worn on the body of a user to assist a muscular strength necessary for the user's exercise and to induce the user to walk for normal exercise. Users without disabilities may also be users of such exercise assistance devices/apparatuses.

SUMMARY

In general, those with or without a physical disability wear an exercise assistance apparatus. Unfortunately, some may find it difficult to undergo the process of wearing the exercise assistance apparatus. Accordingly, there is a need for technology that allows a user, e.g., with limited physical mobility, to put on an exercise assistance apparatus by themselves without the help of another person.

A supporter according to an example embodiment may include: a main body; a pair of main frames connected, directly or indirectly, to the main body; a pair of straps connected, directly or indirectly, to the pair of main frames, respectively; and a bistable spring which is provided inside each of the pair of the straps and maintained in one of two stable states by a restoring force. The two stable states may include a first stable state in which the bistable spring has a shape extending straight along the longitudinal direction and a second stable state in which the bistable spring has a shape that is bent once, and the shape of the strap may be determined according to the shape of the bistable spring.

Where the bistable spring is in the first stable state, each of the pair of straps may maintain or substantially maintain a shape extending forward from the main frame.

Where both of the bistable springs provided inside the pair of straps, respectively, are in the second stable state, each of the straps may overlap the other.

The bistable spring may include a protruding shape in a direction perpendicular to the longitudinal direction when the bistable spring is in the first stable state, and a curvature of the protruding shape may decrease during transition from the first stable state to the second stable state.

A position of the bistable spring may be fixed, directly or indirectly, based on a longitudinal direction of the strap.

The strap may include an accommodation space for accommodating the bistable spring, and a width of the accommodation space may be greater than a width of the strap, based on a direction perpendicular to a longitudinal direction of the strap.

A width of the bistable spring in the second stable state may be greater than a width of the bistable spring in the first stable state and may be less than the width of the accommodation space.

The supporter may include a pad provided inside the strap and configured to overlap the bistable spring with respect to a direction perpendicular to a longitudinal direction of the strap.

The pad may be detachable from the strap.

The supporter may include a pair of auxiliary straps connected, directly or indirectly, to any one of the pair of straps and configured to wrap around the other strap.

The supporter further include an auxiliary bistable spring provided inside each of the auxiliary straps.

The supporter may include an inner frame provided inside the strap and including a material that is relatively stiffer than that of the strap.

The inner frame may include a first inner frame extending from the main frame and connected, directly or indirectly, to the bistable spring; and a second inner frame extending from the bistable spring toward an end portion of the strap.

The bistable spring may be provided in plurality, and the bistable springs may be apart from each other in a longitudinal direction of the strap.

A supporter according to an example embodiment may include: a main frame; a pair of straps connected, directly or indirectly, to both end portions of the main frame, respectively; and a bistable spring provided inside each of the straps and configured to maintain in any one of two stable states through a restoring force. The two stable states may include a first stable state in which the bistable spring has a shape extending straight along the longitudinal direction and a second stable state in which the bistable spring has a shape that is bent once, and the shape of the strap may be determined according to the shape of the bistable spring.

A wearable exercise assistance apparatus according to an example embodiment may include: a main body; a pair of main frames connected to the main body; a pair of straps connected to the pair of main frames, respectively; a bistable spring provided inside each of the pair of straps and maintained in any one of two stable states by a restoring force; an actuator disposed in the main frame; and a driving frame configured to be rotatable by receiving power from the actuator.

The two stable states may include a first stable state in which the bistable spring has a shape extending straight along the longitudinal direction and a second stable state in which the bistable spring has a shape that is bent once, and the shape of the strap may be determined according to the shape of the bistable spring.

Where the bistable spring is in the first stable state, each of the straps may maintain or substantially maintain a shape extending forward from the main frame.

The exercise assistance apparatus may include a pad provided inside the strap and configured to overlap the bistable spring with respect to a direction perpendicular to a longitudinal direction of the strap.

The exercise assistance apparatus may include an inner frame provided inside the strap and include a material that is relatively stiffer than that of the strap.

BRIEF DESCRIPTION OF DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
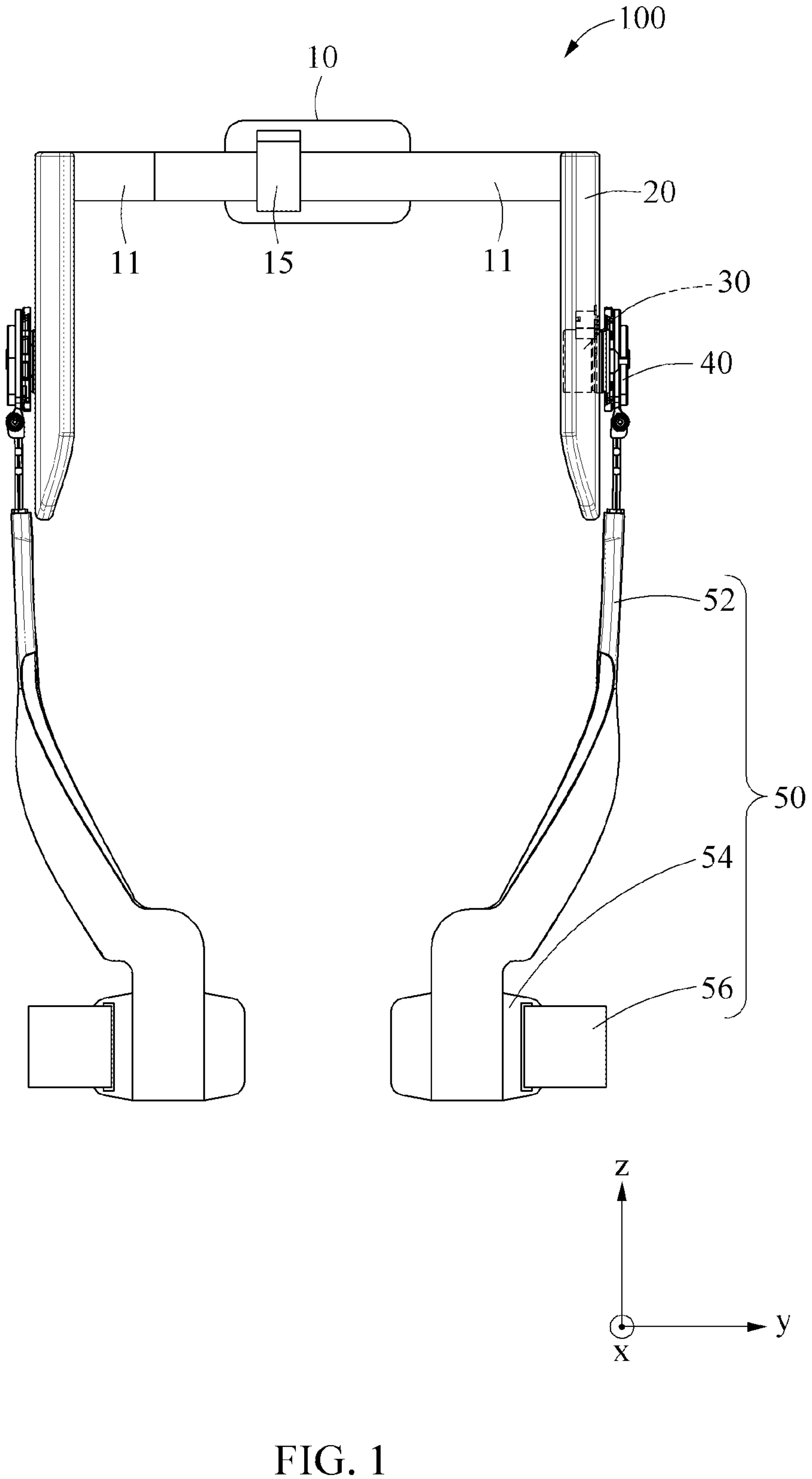
FIG. 1 is a front view of an exercise assistance apparatus according to an example embodiment.

The following structural or functional descriptions of examples are merely intended for the purpose of describing the examples and the examples may be implemented in various forms. Here, examples are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, at least a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples will be described in detail with reference to the accompanying drawings. When describing the example embodiments with reference to the accompanying drawings, like reference numerals refer to like constituent elements and a repeated description related thereto will be omitted.

Figure 2:
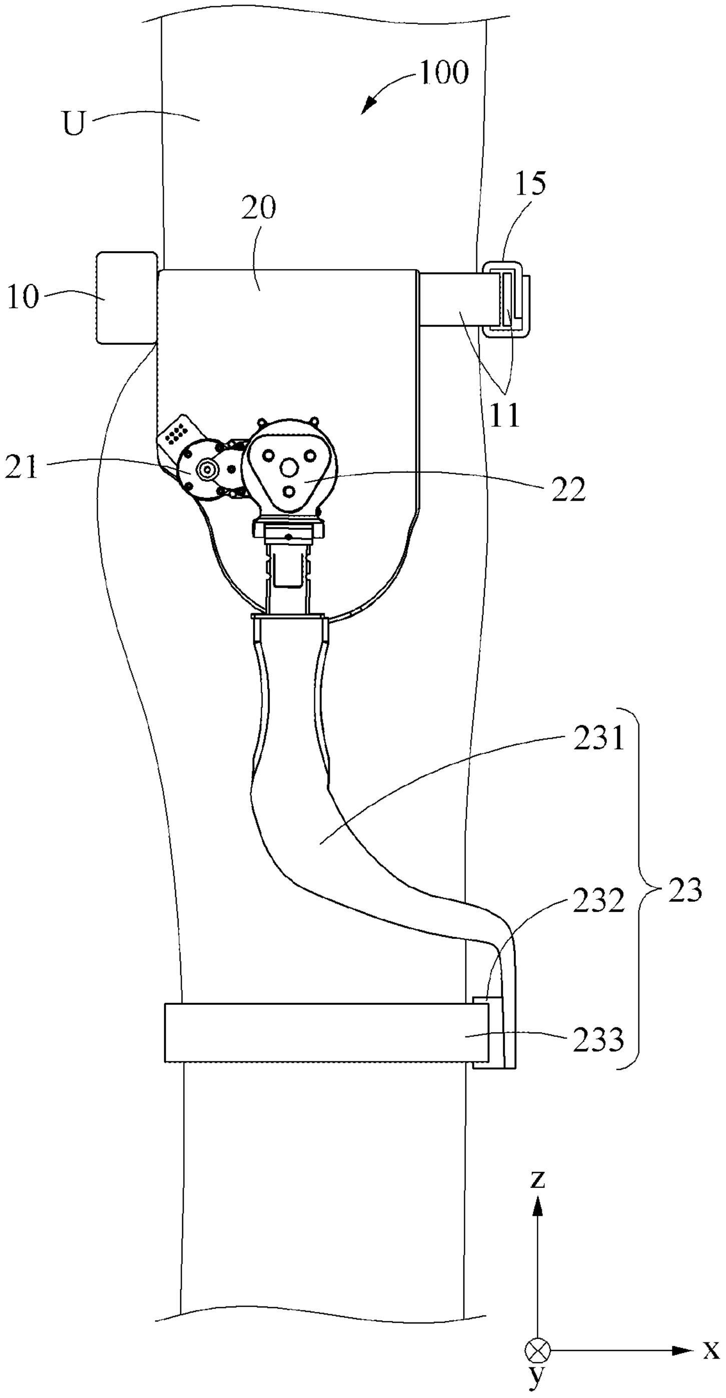
FIG. 2 is a side view of an exercise assistance apparatus according to an example embodiment.

FIG. 1 is a front view illustrating an exercise assistance apparatus according to an example embodiment, and FIG. 2 is a side view illustrating an exercise assistance apparatus according to an example embodiment.

Referring to FIGS. 1 and 2, an exercise assistance apparatus 100 may be worn by a user to assist a motion of the user. The user may be a human, an animal, or a robot but may not be limited thereto. In addition, although FIG. 1 illustrates a case in which the exercise assistance apparatus 100 assists the user's thigh exercise, the exercise assistance apparatus 100 may assist other parts of the upper body, such as a hand, an upper arm, and a lower arm of the user, or other parts of the lower body, such as a foot and calf of the user (see FIG. 18). That is, the exercise assistance apparatus 100 may assist a motion of a part of the user's body. Hereinafter, a case in which the exercise assistance apparatus 100 assists a motion of a person's thigh is described as an example.

The exercise assistance apparatus 100 may include a main body 10, a pair of main frames 20, a pair of straps 11, and an auxiliary strap 15 connected, directly or indirectly, to any one of the pair of straps 11, an actuator 21, a joint member 22, and a driving frame 23.

The main body 10 may accommodate, therein, a controller (not shown) for controlling the actuator 21 and a power supply (not shown) for supplying power to the actuator 21. For example, the main body 10 may be on the user's back side, based on a state in which the exercise assistance apparatus 100 is worn on the user's body. The pair of main frames 20 may be connected, directly or indirectly, to the main body 10.

The main frame 20 may be fixed, directly or indirectly, onto the user. The main frame 20 may contact at least a portion of the user's outer surface. The main frame 20 may have a shape surrounding the user's outer surface. The main frame 20 may be curved in a shape corresponding to the user's contacted portion. That is, the main frame 20 may include a curved surface in contact with the user. For example, the main frame 20 may be fixed, directly or indirectly, to one side of the user's waist.

The pair of straps 11 may be, respectively, connected, directly or indirectly, to the pair of main frames 20. The pair of straps 11 may maintain a shape extending forward (+x direction) before the user wears the exercise assistance apparatus 100 and may not prevent the user from entering the inside of the pair of main frames 20. On the other hand, where the user enters the inside of the pair of main frames 20, the pair of straps 11 may transform, as illustrated in the diagram, and wrap around the front portion of the user. The main body 10, the pair of main frames 20, and the pair of straps 11 may entirely wrap around the circumference of the user.

The pair of auxiliary straps 15 and the pair of straps 11 may be fixed, directly or indirectly, to each other with the pair of straps 11 overlapping each other. For example, one of the pair of straps 11 may wrap around the other strap together with the pair of auxiliary straps 15.

The actuator 21 may provide power that is to be transmitted to the joint member 22. The actuator 21 may include a motor that generates power by receiving voltage or current from the power supply. For example, the actuator 21 may be in a lateral direction of the joint member 22. That is, a rotation axis of the actuator 21 and a rotation axis of the joint member 22 may be apart from each other. In this case, compared to the case where the actuator 21 and the joint member 22 share a rotation axis, the case where the rotation axis of the actuator 21 and the rotation axis of the joint member 22 are apart from each other may reduce a height protruding from the user. Moreover, unlike the diagram, the actuator 21 may be apart from the joint member 22. In this case, a power transmission module for transmitting power from the actuator 21 to the joint member 22 may be provided. The power transmission module may be a rotating body, such as a gear, or a longitudinal direction member, such as a wire, a cable, a string, a rubber band, a spring, a belt, or a chain. However, in an example embodiment, a position and a power transmission structure of the actuator 21 may not be limited.

The joint member 22 may receive power from the actuator 21 to assist a motion of the user's joint. The joint member 22 may be at a position corresponding to the user's joint. The joint member 22 may be on one side of the main frame 20. One side of the joint member 22 may be connected, directly or indirectly, to the actuator 21, and the other side of the joint member 22 may be connected, directly or indirectly, to the driving frame 23. The joint member 22 may be rotated by power transmitted from the actuator 21. An encoder for measuring a rotation angle of the joint member 22 may be on one side of the joint member 22.

The driving frame 23 may partially assist the user's motion. The driving frame 23 may be rotated by the rotational force of the joint member 22. The driving frame 23 may include a support frame 231, an action member 232, and a support member 233.

The support frame 231 may transmit an auxiliary force for assisting a motion of a part of the user's body. Here, the auxiliary force may be understood as a force acting in the same direction as a motion direction of a part of the user's body. That is, the auxiliary force may be understood as a force excluding a force in a direction intersecting with the motion direction of the part of the user's body from among forces acting on the part of the user's body. One end portion of the support frame 231 may be connected, directly or indirectly, to and meet the joint member 22. The other end of the support frame 231 may be connected to the support member 233 to transmit the auxiliary force to a part of the user's body. For example, the support frame 231 may push or pull the user's thigh. The support frame 231 may extend along the longitudinal direction of the user's thigh. The support frame 231 may be bent to wrap around at least a portion of the circumference of the user's thigh.

The action member 232 may apply an auxiliary force to a part of the user's body. The action member 232 may be between the other end portion of the support frame 231 and the support member 233. For example, the action member 232 may be on one side of the user's thigh to push or pull the user's thigh. The action member 232 may be on the front side of the user's thigh. The action member 232 may be along the circumferential direction of the user's thigh. The action member 232 may extend to both sides around the other end portion of the support frame 231. The action member 232 may include a curved surface corresponding to the user's thigh.

The support member 233 may be connected to one side of the action member 232. For example, the support member 233 may surround at least a portion of the user's thigh, so that the support member 233 may prevent the user's thigh from being separated from the support frame 231.

Figure 3:
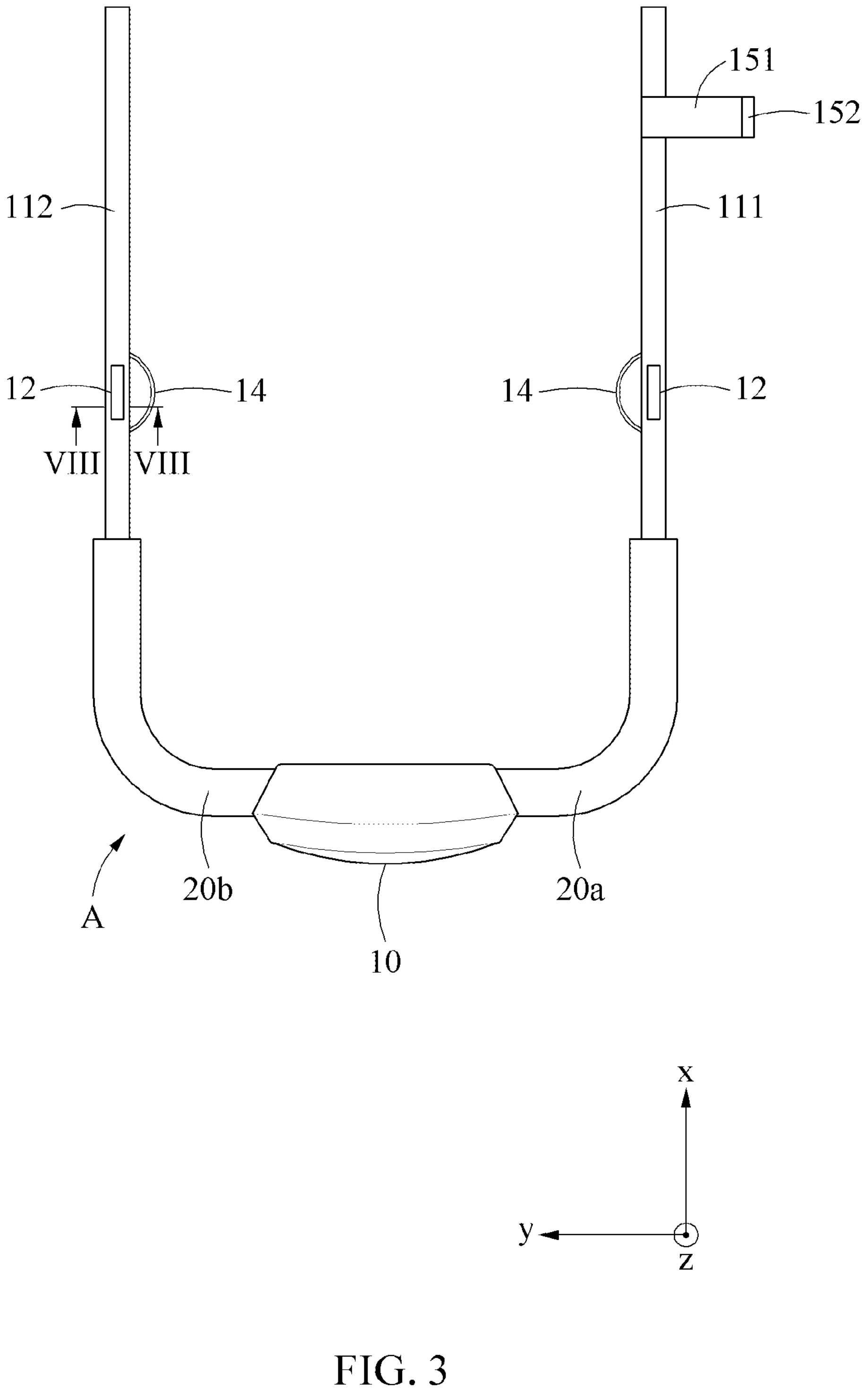
FIG. 3 is a plan view illustrating a supporter when a bistable spring is in a first stable state, according to an example embodiment.
Figure 4:
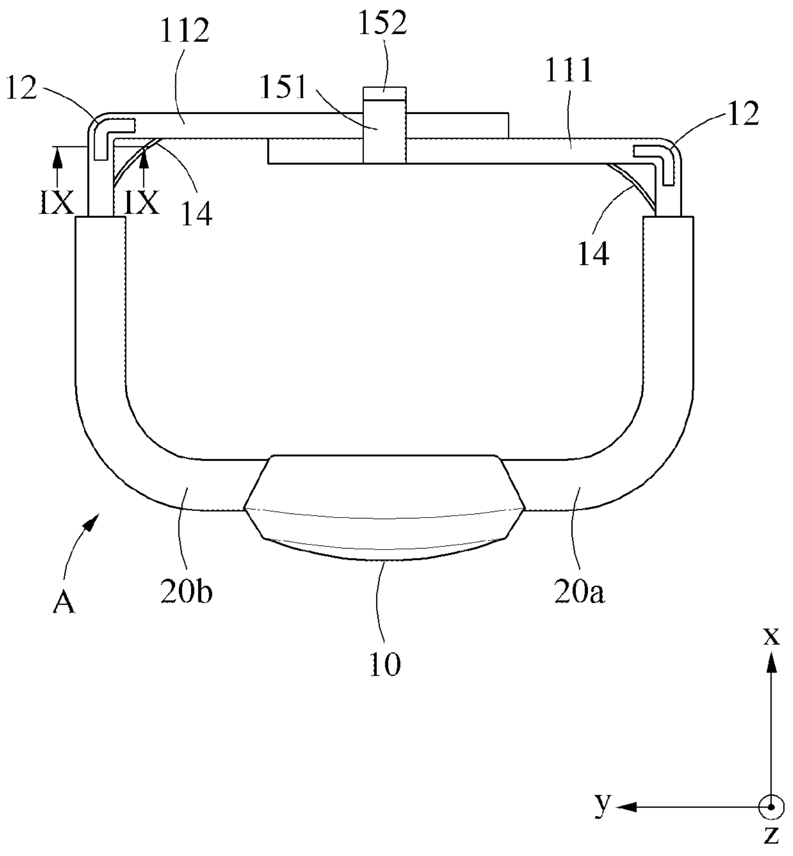
FIG. 4 is a plan view illustrating a supporter when a bistable spring is in a second stable state, according to an example embodiment.

FIG. 3 is a plan view illustrating a supporter when a bistable spring is in a first stable state, according to an example embodiment, and FIG. 4 is a plan view illustrating a supporter when a bistable spring is in a second stable state, according to an example embodiment.

Referring to FIGS. 3 and 4, an exercise assistance apparatus 100 may include a supporter A that is worn on a user's body to supporter a part of the user's body. Here, the supporter A may include a main body 10, a pair of main frames 20*a* and 20*b*, a pair of straps 111 and 112, a bistable spring 12, a pad 14 and a pair of auxiliary straps 151 and 152.

The pair of main frames 20*a* and 20*b* may include the first main frame 20*a* connected to the right side of the main body 10 and the second main frame 20*b* connected to the left side of the main body 10. The pair of main frames 20*a* and 20*b* may partially surround a part of the user's body.

The pair of straps 111 and 112 may include the first strap 111 connected to the first main frame 20*a* and the second strap 112 connected to the second main frame 20*b*.

The first strap 111 and the second strap 112 may each have a 'first shape' as illustrated in FIG. 3 or a 'second shape' as illustrated in FIG. 4. For example, where the first strap 111 or the second strap 112 temporarily fails to maintain the 'first shape' or the 'second shape' due to an external force, the first strap 111 or the second strap 112 may be restored to the 'first shape' or the 'second shape' by a restoring force of the bistable spring 12.

Where the user does not enter the inside of the pair of main frames 20*a* and 20*b*, each of the straps 111 and 112 may maintain the 'first shape' and a shape extending forward from the pair of main frames 20*a* and 20*b*. On the other hand, when the user wears the exercise assistance apparatus 100, that is, when the user enters the inside of the pair of main frames 20*a* and 20*b*, each of the straps 111 and 112 may be transformed from the 'first shape' to the 'second shape' and wrap around the front of the user. For example, the user may apply an external force to the pair of straps 111 and 112 by hand to transform the pair of straps 111 and 112 from the 'first shape' to the 'second shape'.

The bistable spring 12 may be provided inside each of the straps 111 and 112 and may be maintained in any one of the two stable states through a restoring force. The two stable states may include a 'first stable state' in which the bistable spring 12 has a shape extending straight along the longitudinal direction and a 'second stable state' in which the bistable spring 12 has a shape that is bent once.

A shape of a strap may be determined according to a shape of the bistable spring 12. For example, when the bistable spring 12 is in the 'first stable state', the strap may maintain the 'first shape', and when the bistable spring 12 is in the 'second stable state', the strap may maintain the 'second shape'.

Where the bistable spring 12 provided inside the pair of straps 111 and 112 is in the 'first stable state', the pair of straps 111 and 112 may maintain shapes extending forward (+x direction) from the pair of main frames 20*a* and 20*b*, respectively.

Where the bistable spring 12 provided inside the pair of straps 111 and 112 is in the 'second stable state', the pair of straps 111 and 112 may overlap each other in the +x direction.

The pad 14 may be provided on the inside of a strap and overlap the bistable spring 12 in a direction perpendicular to the longitudinal direction of the strap. For example, the pad 14 provided on the inside (−y direction) of the first strap 111 may overlap the bistable spring 12 provided inside the first strap 111, based on a direction (y-axis direction) perpendicular to the longitudinal direction (x-axis) of the first strap 111.

The pad 14 may adjust an angle formed by the pair of straps 111 and 112 when the pair of straps 111 and 112 is in the 'second shape'. The pad 14 may act as a resistance while the pair of straps 111 and 112 is in transition from the 'first shape' to the 'second shape'. As the thickness of the pad 14 increases, the angle formed by the pair of straps 111 and 112 in the 'second shape' may increase. The pad 14 may be detachable from the pair of straps 111 and 112. The exercise assistance apparatus may be adjusted to fit the user's body size by appropriately utilizing the thickness and material of the pad 14 to adjust an angle of the strap in the 'second shape'.

The pair of straps 111 and 112 may be fixed, directly or indirectly, by surrounding the second strap 112, in a state in which the pair of auxiliary straps 151 and 152 is connected to the first strap 111 and the first strap 111 overlaps the second strap 112. For example, an auxiliary bistable spring (not shown) may be provided inside the pair of auxiliary straps 151 and 152.

Figure 5:
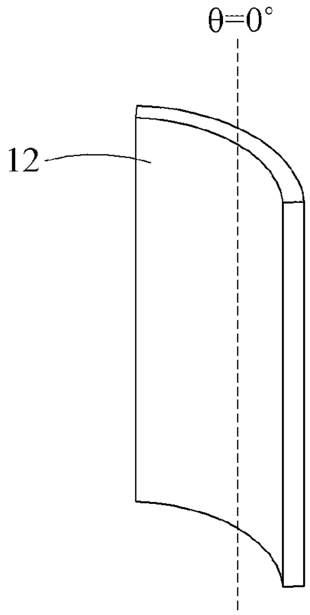
FIG. 5 is a perspective view illustrating a bistable spring in a first stable state.
Figure 6:
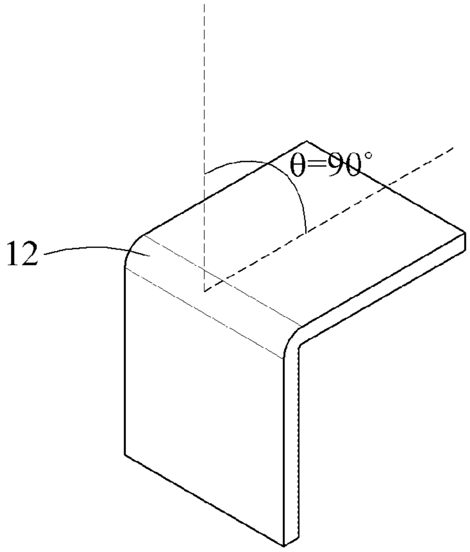
FIG. 6 is a perspective view illustrating a bistable spring in a second stable state.
Figure 7:
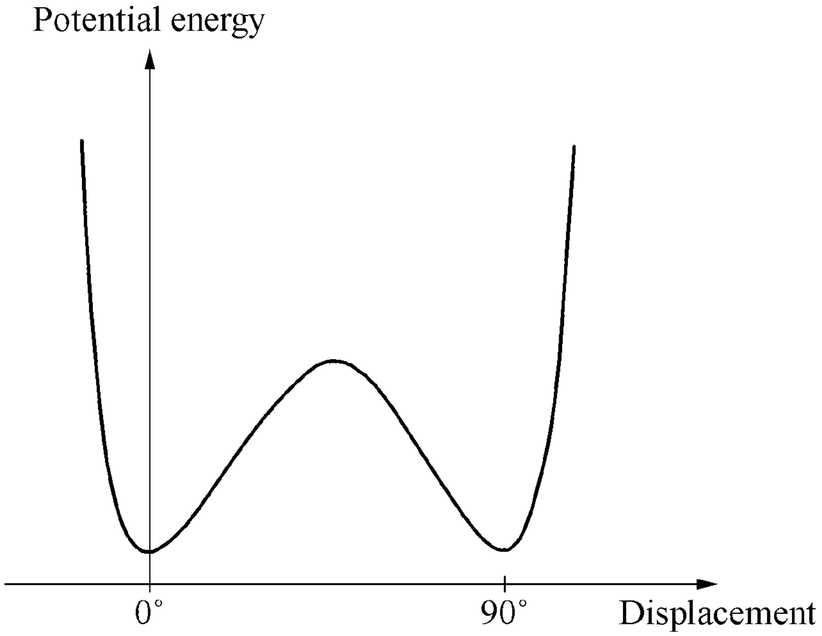
FIG. 7 is a graph schematically illustrating potential energy according to a displacement angle of a bistable spring.

FIG. 5 is a perspective view illustrating a bistable spring in a first stable state, FIG. 6 is a perspective view illustrating a bistable spring in a second stable state, and FIG. 7 is a schematic graph of potential energy according to a displacement angle of a bistable spring.

Referring to FIGS. 5 to 7, when a bistable spring 12 is in the 'first stable state', the bistable spring 12 may have a protruding shape in a direction (x-axis direction) perpendicular to the longitudinal direction (y-axis direction). The bistable spring 12 may transform such that a curvature of the protruding shape decreases during transition from the 'first stable state' to the 'second stable state'. That is, when the bistable spring 12 is in the 'second stable state', the bistable spring 12 may have a relatively flat shape except for a curved portion.

A state where the bistable spring 12 is 0 degrees and a state where the bistable spring is 90 degrees with respect to the y-axis may correspond to a point with the smallest potential energy and are illustrated as the 'first stable state' and the 'second stable state', respectively. However, the angles constituting the stable state may not be limited to 0 degrees or 90 degrees and may vary depending on a material or shape of a bistable spring.

Figure 8:
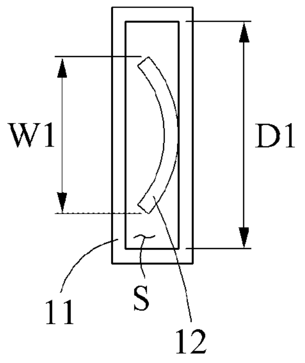
FIG. 8 is a cross-sectional view taken along the line VIII-VIII of FIG. 3.
Figure 9:
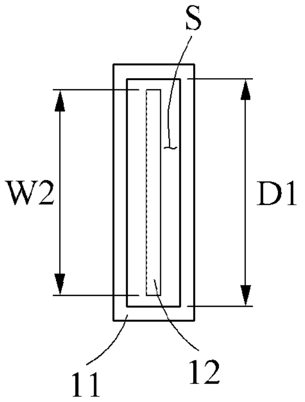
FIG. 9 is a cross-sectional view taken along the line IX-IX of FIG. 4.
Figure 10:
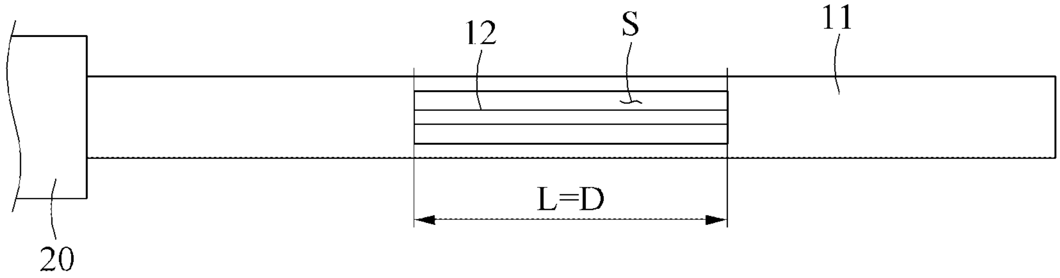
FIG. 10 is a cross-sectional view illustrating a main frame, a strap, and a bistable spring, according to an example embodiment.

FIG. 8 is a cross-sectional view taken along the line VIII-VIII of FIG. 3, FIG. 9 is a cross-sectional view taken along the line IX-IX of FIG. 4, and FIG. 10 is a cross-sectional view illustrating a main frame, a strap, and a bistable spring, according to an example embodiment.

Referring to FIGS. 8 to 10, a strap 11 may include an accommodation space S for accommodating a bistable spring 12. A position of the bistable spring 12 may be fixed with respect to a longitudinal direction of the strap 11. For example, the width of the accommodation space S based on the longitudinal direction of the strap 11 may be the same as the width of the bistable spring 12.

On the other hand, based on a direction perpendicular to the longitudinal direction of the strap 11, the width of the accommodating space S may be greater than the width of the strap 11. According to such a shape, a state may be freely transformed between the 'first stable state' and the 'second stable state' within the bistable spring 12.

In the first stable state, a width W1 of the bistable spring 12 may be less than a width D1 of the accommodation space S. In addition, in the second stable state, a width W2 of the bistable spring 12 may be greater than the width W1 of the bistable spring 12 and less than the width D1 of the accommodation space S. According to such a structure, the bistable spring 12 may transform a state without interfering with the inner wall of the strap 11 forming the accommodation space S.

A length L of the bistable spring 12 may be equal to a length D of the accommodation space S. The bistable spring 12 may be fixed, directly or indirectly, inside the strap 11.

Figure 11:
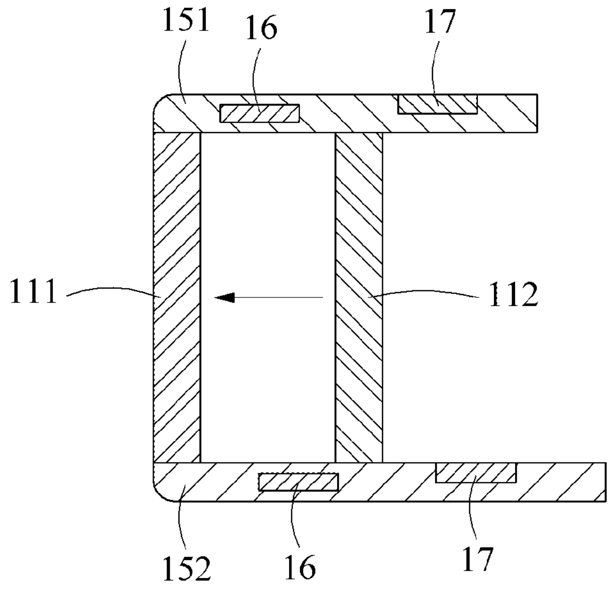
FIG. 11 is a cross-sectional view illustrating a view in which a second strap approaches a first strap.
Figure 12:
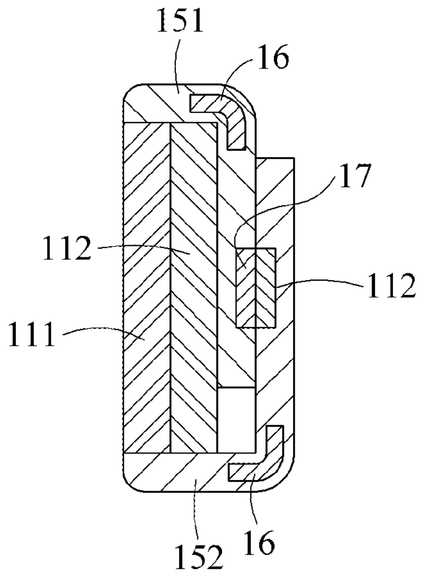
FIG. 12 is a cross-sectional view illustrating a state in which a pair of straps is fixed by a fastening member.

FIG. 11 is a cross-sectional view illustrating a state in which a second strap approaches a first strap, and FIG. 12 is a cross-sectional view illustrating a state in which a pair of straps is fixed, directly or indirectly, by a fastening member.

Referring to FIGS. 11 and 12, each of auxiliary straps 151 and 152 may be provided with an auxiliary bistable spring 16. The pair of auxiliary straps 151 and 152 may maintain a straight shape in a state in which an external force is not applied to the pair of auxiliary straps 151 and 152 by the auxiliary bistable spring 16. Since the pair of auxiliary straps 151 and 152 maintains a shape extending straight, a user may bring a second strap 112 closer to a first strap 111 without opening the pair of auxiliary straps 151 and 152.

Each of the auxiliary straps 151 and 152 may be provided with a magnet 17 for fixation. Based on a state in which the auxiliary straps 151 and 152 overlap each other, the magnet 17 provided in the first strap 151 and the magnet 17 provided in the second strap 152 may face each other with opposite polarity.

Figure 13:
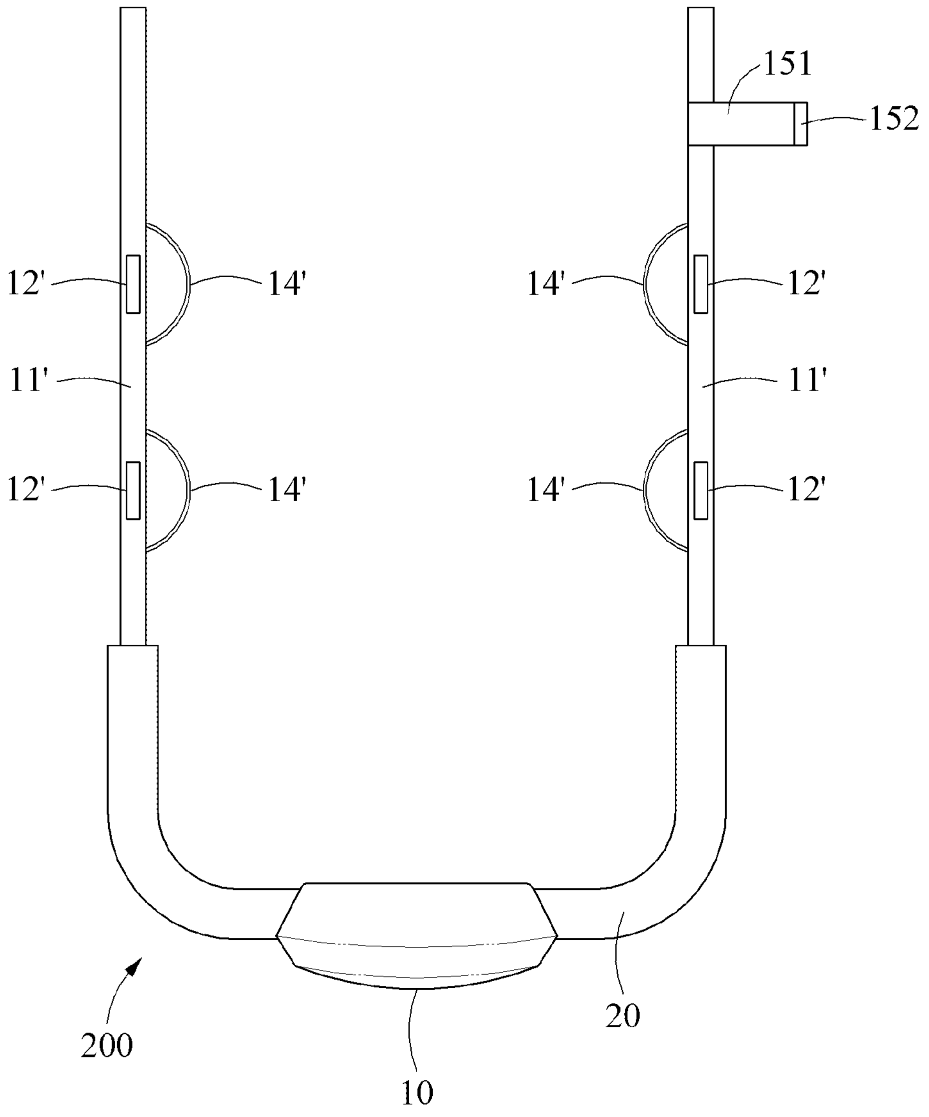
FIGS. 13 and 14 are plan views illustrating a supporter according to an example embodiment.
Figure 14:
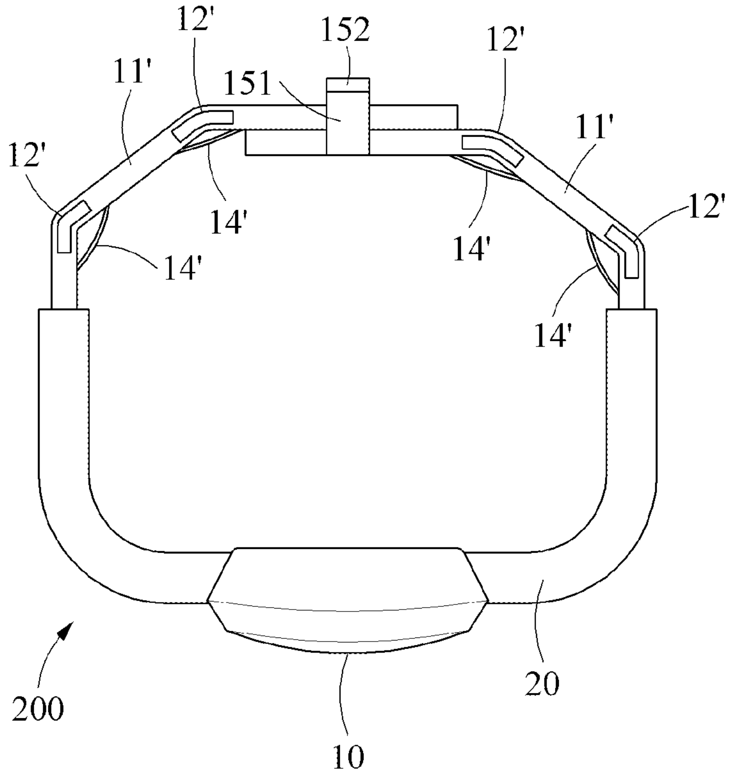

FIGS. 13 and 14 are plan views illustrating a supporter according to an example embodiment.

Referring to FIGS. 13 and 14, an exercise assistance apparatus 200 may include a main body 10, a main frame 20, a strap 11 (11'), a bistable spring 12', a pad 14', and auxiliary straps 151 and 152.

The bistable springs 12' and the pads 14' may be provided in plurality and apart from each other in the longitudinal direction of the strap 11/11'. A stable shape implementable by the strap 11' may be adjusted through a plurality of bistable springs 12'. For example, in the case of a user with a large torso, the strap 11' may need to be bent multiple times. In this case, the number of times the strap 11' is bent may be set by using the plurality of bistable springs 12'.

Figure 15:
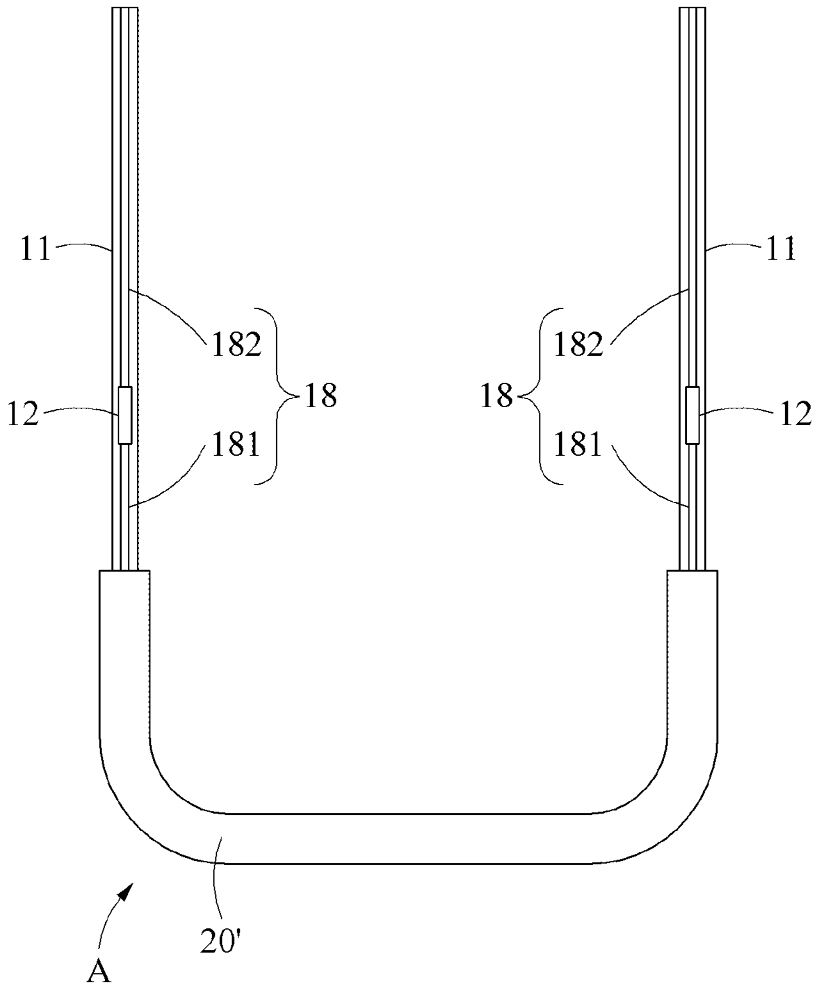
FIG. 15 is a plan view schematically illustrating a supporter according to an example embodiment.
Figure 16:
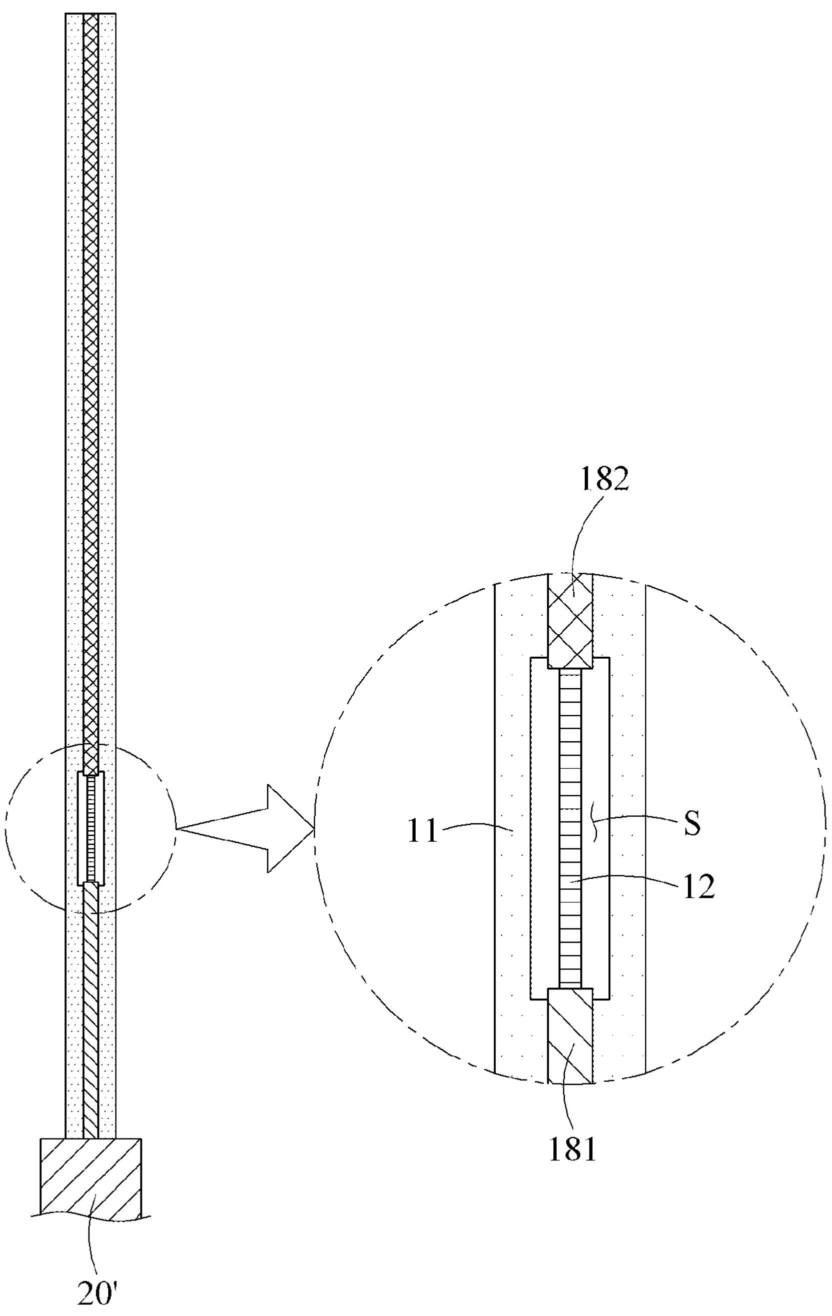
FIGS. 16 and 17 are cross-sectional views illustrating a main frame, a strap, a bistable spring, and an inner frame, according to an example embodiment.
Figure 17:
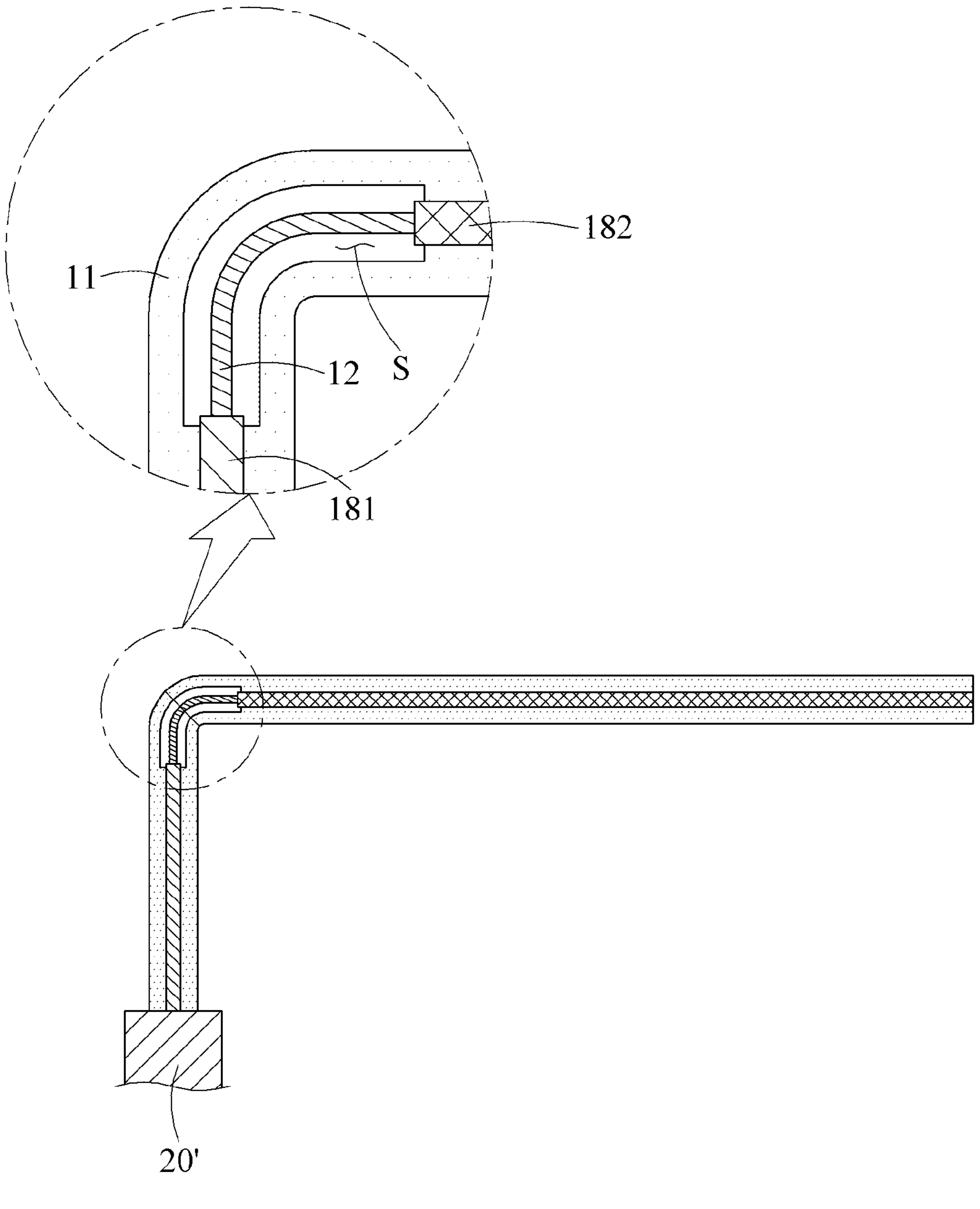

FIG. 15 is a plan view schematically illustrating a supporter according to an example embodiment, and FIGS. 16 and 17 are cross-sectional views illustrating a main frame, a strap, a bistable spring, and an inner frame, according to an example embodiment.

Referring to FIGS. 15 to 17, a supporter A may include a main frame 20', a pair of straps 11 connected to both ends of the main frame 20', respectively, a bistable spring 12 provided inside the strap 11, and an inner frame 18 connected to each of both end portions of the bistable spring 12.

The main frame 20' may not be connected to a main body, unlike the main frame described with reference to FIGS. 1 to 17. The main frame 20' may have, for example, a U-shape. The supporter A may wrap around a part of a user's body.

The inner frame 18 may be formed of a material relatively stronger than the strap 11. The inner frame 18 may assist the strap 11 to maintain a shape. For example, the inner frame 18 may include a first inner frame 181, which extends from one end of the main frame 20' and is connected, directly or indirectly, to one end of the bistable spring 12, and a second inner frame 182, which is connected to the other end of the bistable spring 12 and extends toward one end of the strap 11.

The inner frame 18 may not be exposed to the outside since the inner frame 18 is covered by the strap 11. The inner frame 18 may fix the position of the bistable spring 12 provided inside an accommodation space S.

Each embodiment herein may be used in combination with any other embodiment(s) described herein.

Figure 18:
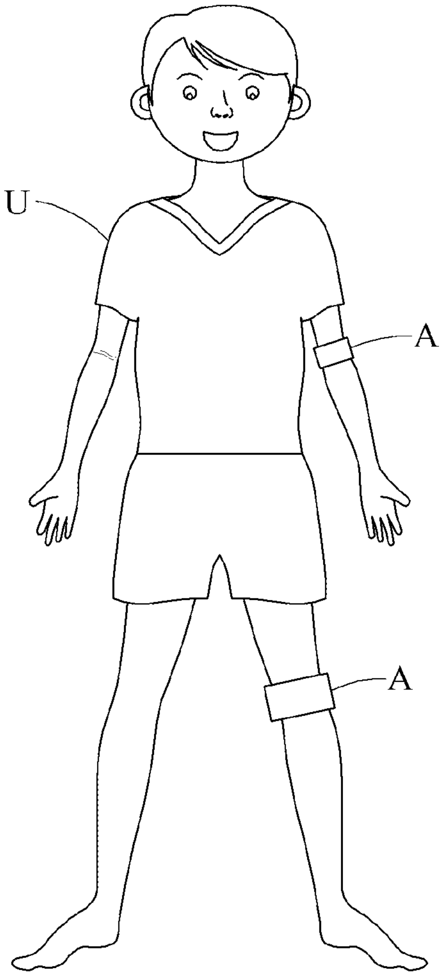
FIG. 18 is a front view schematically illustrating a view in which a supporter is worn on the body, according to an example embodiment.

FIG. 18 is a front view schematically illustrating a state in which a supporter is worn on the body, according to an example embodiment.

Referring to FIG. 18, a supporter A may be worn at various positions on the body of a user U. For example, the supporter A may be worn on the user's upper arm to assist the user's elbow joint motion together with an actuator, a joint member, and a driving frame (not shown). In another example, the supporter A may be worn on the user's thigh to assist the user's knee joint motion.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

Therefore, the scope of the disclosure is defined not by the detailed description, but by the claims and their equivalents, and all variations within the scope of the claims and their equivalents are to be construed as being included in the disclosure.

The invention claimed is:

1. A supporter for a wearable apparatus, the supporter comprising:

a main body configured to be mounted at least partially around a waist of a user;

a pair of main frames connected to the main body;

a pair of straps connected to the pair of main frames, respectively; and a bistable spring inside each of the pair of the straps and configured to be maintained in at least one of two stable states by a restoring force, wherein:

the two stable states comprise a first stable state in which the bistable spring has a shape extending straight forwardly from the main frames along a longitudinal direction and a second stable state in which the bistable spring has a shape that is bent, and the shape of the corresponding strap is determined based at least on the shape of the corresponding bistable spring.

2. The supporter of claim 1, wherein each of the pair of straps maintains a shape extending forward from the main frame, where the bistable spring is in the first stable state.

3. The supporter of claim 1, wherein each of the pair of straps overlaps the other, when both of the bistable springs provided inside the pair of straps, respectively, are in the second stable state.

4. The supporter of claim 1, wherein each of the bistable springs comprises a protruding shape in a direction perpendicular to the longitudinal direction when the bistable spring is in the first stable state, and a curvature of the protruding shape is configured to decrease during transition from the first stable state to the second stable state.

5. The supporter of claim 1, wherein each of the bistable springs is configured so that a position of the bistable spring is based on a longitudinal direction of the strap.

6. The supporter of claim 1, wherein each of the straps comprises an accommodation space for accommodating the corresponding bistable spring, and a width of the accommodation space is greater than a width of the strap, based on a direction perpendicular to a longitudinal direction of the strap.

7. The supporter of claim 6, wherein each of the bistable springs is configured so that a width of the bistable spring in the second stable state is greater than a width of the bistable spring in the first stable state and less than the width of the accommodation space.

8. The supporter of claim 1, further comprising a pad provided inside each of the straps and configured to overlap the corresponding bistable spring with respect to a direction perpendicular to a longitudinal direction of the strap.

9. The supporter of claim 8, wherein each of the pads is detachable from the corresponding strap.

10. The supporter of claim 1, further comprising a pair of auxiliary straps connected to any one of the pair of straps and configured to wrap around the other strap.

11. The supporter of claim 10, further comprising an auxiliary bistable spring provided inside each of the auxiliary straps.

12. The supporter of claim 1, further comprising an inner frame provided inside at least one of the straps and comprising a material that is relatively stiffer than that of the strap.

13. The supporter of claim 12, wherein the inner frame comprises:

a first inner frame extending from the main frame and connected to at least one of the bistable springs; and a second inner frame extending from the bistable spring toward an end portion of at least one of the straps.

14. The supporter of claim 1, wherein in each strap the bistable spring is provided in plurality, and the bistable springs are apart from each other in a longitudinal direction of the strap.

15. A wearable exercise assistance apparatus comprising:

the supporter according to claim 1;

an actuator disposed in the main frame; and a driving frame configured to be rotatable by receiving power from the actuator.

16. A wearable exercise assistance apparatus comprising:

an actuator;

a driving frame configured to be movable by receiving power from the actuator, and configured to be mounted at least partially on a thigh of a user;

a support comprising:

a main body configured to be mounted proximate a waist of the user;

a main frame connected to the main body;

a pair of straps connected to the main frame; and a bistable spring at least partially inside each of the pair of straps and configured to be maintained in at least one of two stable states, wherein:

the two stable states comprise a first stable state in which the bistable spring has a shape extending straight forwardly from the main frame and a second stable state in which the bistable spring has a shape that is bent, and the shape of the corresponding strap is determined based at least on the shape of the corresponding bistable spring.

* * * * *